(12) United States Patent
Shoham et al.

(10) Patent No.: US 11,105,740 B2
(45) Date of Patent: Aug. 31, 2021

(54) OPTICAL INSPECTION

(71) Applicant: Applied Materials Israel Ltd., Rehovot (IL)

(72) Inventors: Amir Shoham, Haifa (IL); Binyamin Kirshner, Elkana (IL); David Goldovsky, Dolev (IL); Nitzan Chamiel, Jerusalem (IL)

(73) Assignee: Applied Materials Israel Ltd., Rehovot (IL)

( * ) Notice: Subject to any disclaimer, the term of this patent is extended or adjusted under 35 U.S.C. 154(b) by 119 days.

(21) Appl. No.: 16/659,938

(22) Filed: Oct. 22, 2019

(65) Prior Publication Data

US 2021/0116368 A1 Apr. 22, 2021

(51) Int. Cl.
| | |
|---|---|
| *G01N 21/47* | (2006.01) |
| *G01N 21/21* | (2006.01) |
| *G01N 21/88* | (2006.01) |
| *G01N 21/956* | (2006.01) |
| *G01N 21/95* | (2006.01) |

(52) U.S. Cl.
CPC ............ *G01N 21/47* (2013.01); *G01N 21/21* (2013.01); *G01N 21/8806* (2013.01); *G01N 21/9501* (2013.01); *G01N 21/956* (2013.01); *G01N 2021/8848* (2013.01); *G01N 2201/068* (2013.01)

(58) Field of Classification Search
CPC ..................................................... G01N 21/47
USPC ......................................................... 356/369
See application file for complete search history.

(56) References Cited

U.S. PATENT DOCUMENTS

| | | | | |
|---|---|---|---|---|
| 4,464,050 | A * | 8/1984 | Kato ................... | G11B 7/00375 250/559.45 |
| 7,315,364 | B2 * | 1/2008 | Baer ................... | G01N 21/9501 356/237.2 |
| 8,724,882 | B2 * | 5/2014 | Meshulach ........ | G01N 21/9501 382/145 |
| 8,891,079 | B2 | 11/2014 | Zhao et al. | |
| 9,279,774 | B2 | 3/2016 | Romanovsky et al. | |
| 9,291,575 | B2 | 3/2016 | Zhao et al. | |
| 9,535,010 | B2 | 1/2017 | Gosain et al. | |
| 9,874,526 | B2 | 1/2018 | Liu et al. | |
| 10,295,476 | B1 * | 5/2019 | Kirshner ............ | G01N 21/9501 |
| 2006/0244976 | A1 * | 11/2006 | Baer ..................... | G03F 7/7065 356/600 |
| 2007/0229833 | A1 * | 10/2007 | Rosencwaig ........ | G01N 21/474 356/426 |
| 2011/0075151 | A1 * | 3/2011 | Jeong ................... | G01N 21/956 356/453 |
| 2011/0158502 | A1 * | 6/2011 | Meshulach ........ | G01N 21/9501 382/145 |

(Continued)

*Primary Examiner* — Tarifur R Chowdhury
*Assistant Examiner* — Omar H Nixon
(74) *Attorney, Agent, or Firm* — Kilpatrick Townsend & Stockton LLP

(57) ABSTRACT

Systems and methods for optical inspection of a sample are provided. Radiation scattered from the sample includes a first portion having a first polarization state and a second portion having a second polarization state that is a mirror image of the first polarization state. The first polarization state of the first portion of the scattered radiation is transposed using a polarizing mirroring device so that the scattered radiation output from the polarizing mirroring device has substantially the second polarization state.

20 Claims, 6 Drawing Sheets

(56) References Cited

U.S. PATENT DOCUMENTS

2017/0276613 A1\* 9/2017 Liu ........................ G01N 21/21

\* cited by examiner

OPTICAL INSPECTION

TECHNICAL FIELD

Embodiments described herein relate generally to improved optical inspection and more particularly to filtering scattered radiation to improve image formation and defect detection.

BACKGROUND

Some inspection systems use polarizers to suppress radiation scattered from a sample surface. The intent is to suppress the radiation scattered from the sample without suppressing the radiation scattered from defects. In practice, the radiation scattered from the surface and the radiation scattered from defects are generally both suppressed, but by knowing the polarization patterns, the radiation scattered from the surface can be suppressed more thus reducing the noise and increasing the signal-to-noise ratio (SNR).

The polarization patterns of the scattered radiation generally change with scattering angle. Some systems attempt to account for these changes by segmenting the collection numerical aperture (NA) and using different polarizers and collectors for the different segments. These systems can account for fixed polarization patterns, but as polarization patterns change, for example with samples having different surface patterns, what may have been an optimum polarization for one sample may not be the optimum for another sample. Thus, improved systems and methods having increased flexibility are desired.

SUMMARY

In light of the above, systems and methods for optical inspection are provided that have increased flexibility. In an embodiment, for example, an inspection system may include a polarization mirroring device arranged to transpose a polarization state of a portion of the radiation that has been scattered from a surface of a sample. This can remove mirror symmetry in the polarization pattern of collected radiation. The inspection system can also include a polarization module that filters the collected radiation based on polarization. The polarization module may be tunable to filter the collected radiation based on different polarization patterns. Thus, the systems and methods described herein can suppress radiation scattered from different samples to maximize SNR.

In accordance with a specific embodiment, a method for performing an optical inspection of a patterned sample includes providing an input beam of radiation, adjusting a polarization state of the input beam to provide a polarized input beam, directing the polarized input beam to the sample, and collecting scattered radiation. The scattered radiation includes a portion of the polarized input beam that is scattered by the sample. The scattered radiation includes a first portion having a first polarization state and a second portion having a second polarization state, where the first polarization state is a mirror image of the second polarization state. The method also includes transposing the first polarization state of the first portion of the scattered radiation using a polarizing mirroring device. The first polarization state is transposed so that the first portion of the scattered radiation output from the polarizing mirroring device has substantially the second polarization state. The method also includes receiving the first portion of the scattered radiation output from the polarizing mirroring device and the second portion of the scattered radiation at a polarization module as collected radiation, filtering the collected radiation by suppressing portions of the collected radiation based on polarization to provide filtered radiation, and forming an image of at least a portion of the sample based on the filtered radiation.

In an embodiment, the method also includes identifying defects on the sample based on the image In another embodiment, the first portion of the scattered radiation is a first angular portion, the second portion of the scattered radiation is a second angular portion, and at a pupil plane, the first angular portion is a mirror image of the second angular portion.

In yet another embodiment, the method also includes altering a polarization state of the filtered radiation prior to forming the image. The polarization state of the collected radiation may be altered using a tunable polarization device to provide the filtered radiation.

Embodiments are also directed to apparatuses for carrying out the disclosed methods and include apparatus parts for performing each described method feature. The method features may be performed by way of hardware components, a computer programmed by appropriate software, by any combination of the two, or in any other manner. Furthermore, embodiments are also directed to methods of operating the described apparatuses and include method features for carrying out every function of the apparatuses.

Further aspects, advantages, and features will be apparent to those of ordinary skill in the art in light of the claims, description, and accompanying drawings.

BRIEF DESCRIPTION OF THE DRAWINGS

The various embodiments described herein, both as to organization and method of operation, together with features and advantages thereof, can best be understood by reference to the following detailed description and accompanying drawings, in which.

Figure 1:
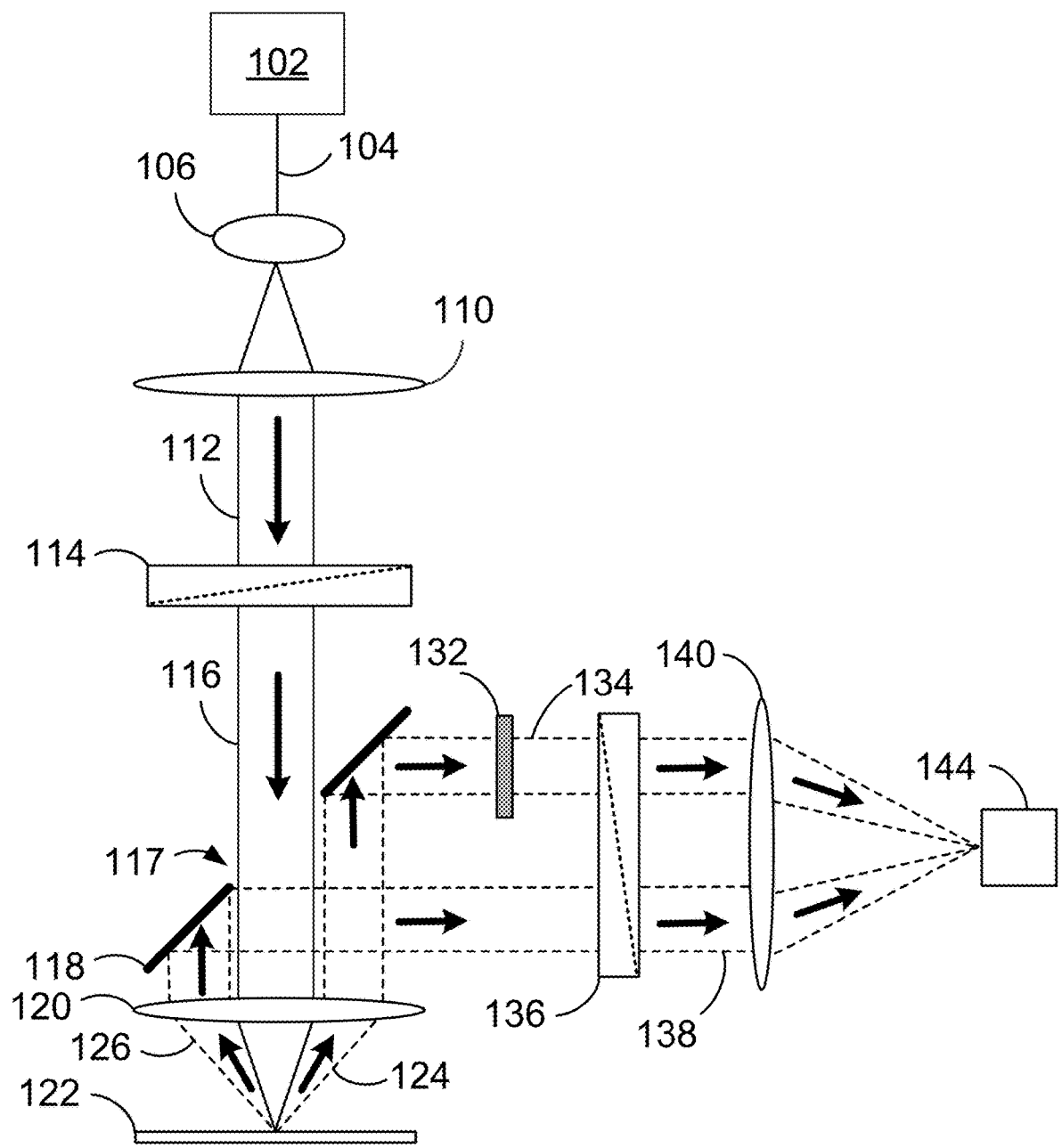
FIG. 1 is a simplified cross-sectional view of an optical inspection system in accordance with an embodiment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the embodiments described herein. However, it should be understood that the various embodiments can be practiced without these specific details. In other instances, well-known methods, procedures, and components have not been described in detail so as not to obscure the described features.

Reference will be made in detail to the various embodiments, one or more examples of which are illustrated in the figures. Each example is provided by way of explanation and is not meant as a limitation. Further, features illustrated or described as part of one embodiment can be used on or in conjunction with other embodiments to yield yet a further embodiment. The description is intended to include these modifications and variations.

A "specimen" or "sample" as referred to herein, includes, but is not limited to, semiconductor wafers, semiconductor workpieces, photolithographic masks, and other workpieces such as memory disks and the like. According to some embodiments, which can be combined with other embodiments described herein, the apparatus and methods are configured for or are applied for inspection and defect review applications.

Embodiments described herein relate generally to systems and methods for improved optical inspection. In accordance with an embodiment, for example, a system for optical inspection of a sample is provided. The system includes a polarization mirroring device arranged to transpose a polarization state of a portion of the radiation that has been scattered from a surface of the sample. The polarization mirroring device can remove mirror symmetry in the polarization pattern of collected radiation. The inspection system also includes a polarization module that filters the collected radiation based on polarization. The polarization module may be tunable to filter the collected radiation based on different polarization patterns. This can suppress radiation scattered from the surface of the sample and increase SNR thus improving defect sensitivity.

FIG. 1 is a simplified cross-sectional view of an optical inspection system in accordance with an embodiment. In this example, an input beam 104 provided by a radiation source 102 passes through a beam expander 106 and collimator 110. The radiation source 102 may be a laser or another light source, and the input beam may be a beam of visible or invisible light. The collimated beam 112 is directed from the collimator 110 to a first polarization module 114. The first polarization module 114 may include one or more waveplates and/or a polarizer. If the first polarization module 114 includes a polarizer, the polarizer may be configured to provide fixed or tunable filtering of the collimated beam 112 based on a polarization state of the collimated beam 112. The first polarization module 114 outputs a polarized beam 116.

A lens module 120 is arranged to receive the polarized beam 116 output from the first polarization module 114 and direct the polarized beam 116 onto a sample 122. In some embodiments, the polarized beam 116 is directed onto the sample 122 as normal illumination, whereas in other embodiments the polarized beam 116 is directed onto the sample 122 at an oblique angle (for example into or out of the page of FIG. 1). The polarized beam 116 may illuminate all or a portion of the sample 122 in some embodiments. In other embodiments, the polarized beam 116 may be focused onto the sample or focused into a spot on the sample by the lens module 120.

The sample 122 may be patterned or unpatterned. A patterned sample 122 has a pattern, for example a device or circuit pattern formed by photolithography and etching processes, on a primary surface. An unpatterned sample 122 has a primary surface without any recognizable pattern.

The polarized beam 116 can be both reflected and scattered by the sample 122. The reflected radiation is not specifically shown in this example, but the scattered radiation can include a first portion 124 and a second portion 126. The first portion 124 has a first polarization state that is a mirror image of a second polarization state of the second portion 126. There may be other portions of the scattered radiation as well that are not specifically shown in this example (for example scattered radiation in a reflected radiation channel).

The first portion 124 of the scattered radiation may be a first angular portion, and the second portion 126 of the scattered radiation may be a second angular portion. At a pupil plane of the collection optics, the first angular portion may be a mirror image of the second angular portion so that the first and second portions 124, 126 have geometric symmetry in addition to polarization symmetry.

The first portion 124 and the second portion 126 of the scattered radiation are collected by the lens module 120 and directed toward an aperture plate 118 positioned at a pupil plane. The aperture plate 118 may include, for example, a mirror or another optically reflective element that reflects at least a part of the first portion 124 and the second portion 126 of the scattered radiation received from the lens module 120. As shown in this example, the aperture plate 118 may also include at least one aperture for allowing the polarized beam 116 to pass through the reflective element 118.

The first portion 124 of the scattered radiation is directed by the aperture plate 118 to a polarization mirroring device 132. The polarization mirroring device 132 may include a polarizing element such as a waveplate for transposing the polarization state of the first portion 124 of the scattered radiation. A main axis of the polarizing element may be parallel to the mirroring symmetry. The polarization state may be transposed so that the first portion 134 of the scattered radiation output from the polarization mirroring device 132 has substantially the same polarization state as the second portion 126 of the scattered radiation (i.e., the second polarization state). It is recognized that the polarization state of the first portion 134 of the scattered radiation output from the polarization mirroring device 132 may deviate slightly from the second polarization state, but it is expected that symmetry of the scattered light (scattered radiation output from the polarization mirroring device 132 and the second portion 126 of the scattered radiation from the aperture plate 118) will be greater than 1:100 in some embodiments. Alternatively, the deviation may be limited based on background suppression by a factor of ×50 in other embodiments (see following description of second polarization module).

A second polarization module 136 is arranged to receive the first portion 134 of the scattered radiation output from the polarization mirroring device 132 and the second portion 126 of the scattered radiation from the aperture plate 118. The second portion 126 of the scattered radiation may propagate to the second polarization module 136 without optical manipulation. The first portion 134 of the scattered radiation and the second portion 126 of the scattered radiation form collected radiation. The second polarization module 136 may be a tunable polarization device that includes one or more waveplates and a polarizer. The one or more waveplates transpose a polarization state of the collected radiation, and the polarizer provides tunable filtering of the collected radiation based on polarization. The second polarization module 136 may suppress portions of the collected radiation based on a pattern on a surface of the sample 122. For example, the second polarization module 136 may be tunable to suppress different portions of the collected radiation based on the pattern on the surface of the sample 122.

Filtered radiation 138 is output from the second polarization module 136 and focused on a detector module 144 using a lens module 140. The detector module 144 is configured to form an image of at least a portion of the sample 122 using the filtered radiation 138. In some embodiments, the detector module 144 is also configured to identify defects on the sample 122 using the image.

It should be appreciated that the system shown in FIG. 1 is used merely as an example, and many components are optional or may be configured differently based on the particular application. The aperture plate and polarization mirroring device described herein may be used with optical inspection systems having other configurations. The systems may or may not include the beam expanders, collimators, and lenses shown herein. Additionally, the systems may include other components not included in these examples.

Figure 2:
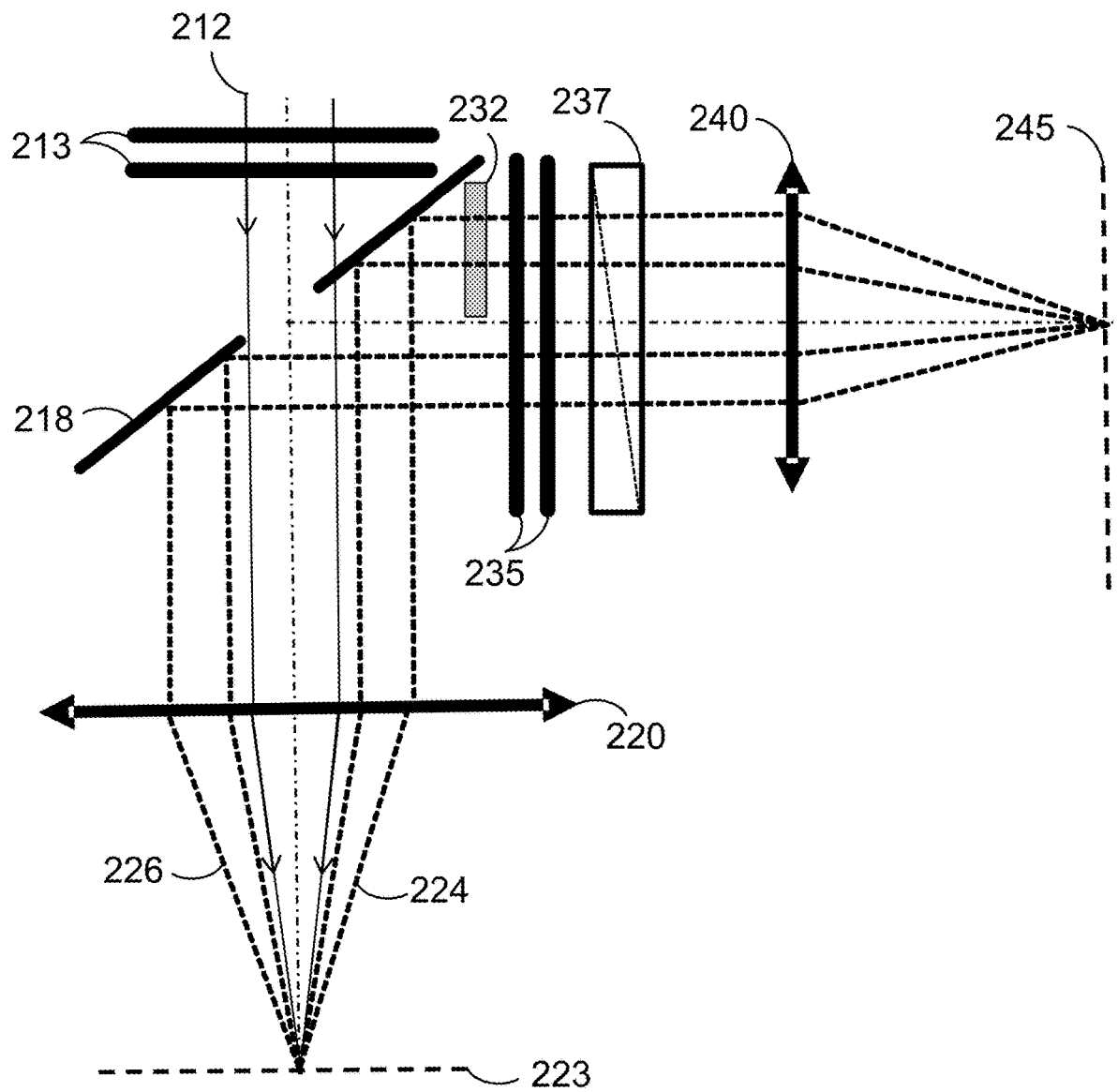
FIG. 2 is a simplified cross-sectional view of a portion of an optical inspection system in accordance with an embodiment.

FIG. 2 is a simplified cross-sectional view of a portion of an optical inspection system in accordance with an embodiment. An input beam 212 is received by one or more waveplates 213 that are configured to transpose a polarization state of the input beam 212. A lens module 220 is arranged to receive the input beam 212 output from the waveplates 213. The input beam 212 is directed from the lens module 220 to a sample plane 223. A surface of a sample may be arranged at the sample plate 223. The input beam 216 is scattered at the sample plane 223, and the scattered radiation includes a first portion 224 and a second portion 226. The first portion 224 has a first polarization state that is a mirror image of a second polarization state of the second portion 226.

The first portion 224 and the second portion 226 of the scattered radiation are collected by the lens module 220 and directed toward an aperture plate 218. The first portion 224 of the scattered radiation is directed by the aperture plate 218 to a polarization mirroring device 232. The polarization mirroring device 232 may be configured to transpose the polarization state of the first portion 224 of the scattered radiation. The polarization state may be transposed so that the scattered radiation output from the polarization mirroring device 232 has substantially the same polarization state as the second portion 226 of the scattered radiation (i.e., the second polarization state).

In this example, one or more waveplates 235 are arranged to receive the output from the polarization mirroring device 232 and the second portion 226 of the scattered radiation from the aperture plate 218 as collected radiation. The one or more waveplates 235 may include, for example, a half wave plate and a quarter wave plate. The waveplates 235 are configured to transpose a polarization state of the collected radiation. A tunable polarization device 237 receives the output from the waveplates 235 and provides tunable filtering of the collected radiation based on polarization. The tunable polarization device 237 may suppress portions of the collected radiation to provide filtered radiation.

The filtered radiation output from the tunable polarization device 237 is focused on a image plane 245 by a lens module 240. A detector module may be arranged at the image plane 245 to form an image. In some embodiments, the detector module may also be configured to identify defects using the image.

Figure 3:
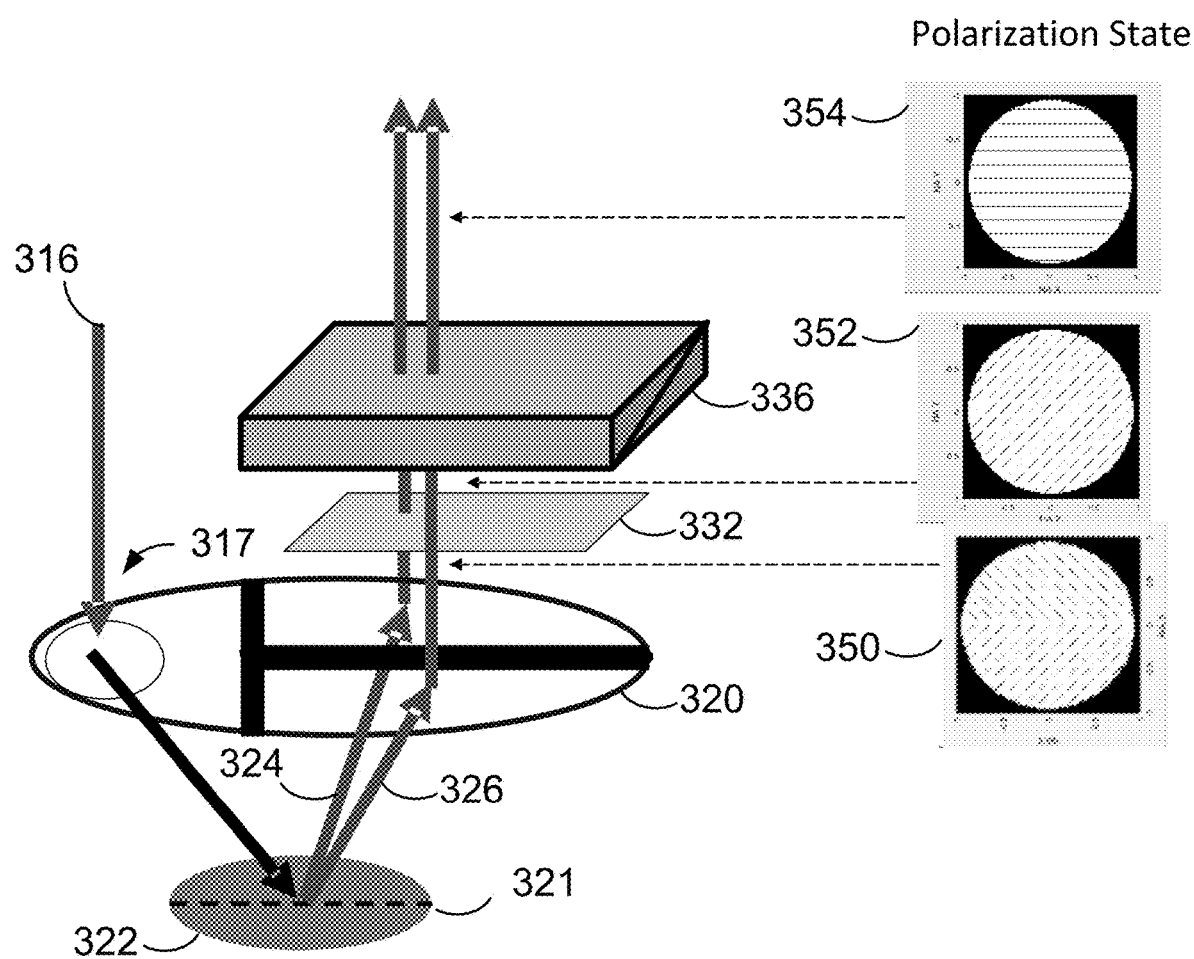
FIG. 3 is a simplified perspective view of a portion of an optical inspection system showing polarization states over the NA before and after a polarization mirroring device in accordance with an embodiment.

FIG. 3 is a simplified perspective view of a portion of an optical inspection system showing polarization states over the NA before and after a polarization mirroring device in accordance with an embodiment. In this example, an input beam 316 is directed through an area 317 of a lens module 320 and onto a sample 322. Portions of the input beam 316 impinging on a first side of a line of symmetry 321 form a first portion 324 of scattered radiation, and portions of the input beam 316 impinging on a second side of the line of symmetry 321 form a second portion 326 of the scattered radiation. The line of symmetry 321 is a virtual line separating the first and second portions 324, 326 of the scattered radiation. The first portion 324 has a first polarization state that is a mirror image of a second polarization state of the second portion 326. This is illustrated in polarization plot 350. As shown in this example, the first and second portions 324, 326 of the scattered radiation may pass through different portions of the lens module 320.

The first portion 324 of the scattered radiation is directed to a polarization mirroring device 332. An aperture plate is not separately shown in this example. The polarization mirroring device 332 is configured to transpose the polarization state of the first portion 324 of the scattered radiation. The polarization state may be transposed so that the scattered radiation output from the polarization mirroring device 332 has substantially the same polarization state as the second portion 326 of the scattered radiation. This is illustrated in polarization plot 352, where all of the scattered radiation has the same polarization state (i.e., the second polarization state).

A polarization module 336 is arranged to receive the output from the polarization mirroring device 332 and the second portion 326 of the scattered radiation. The output from the polarization mirroring device 332 and the second portion 326 of the scattered radiation form collected radiation. The polarization module 336 may be a tunable polarization device that includes one or more waveplates and a polarizer. The one or more waveplates transpose a polarization state of the collected radiation, and the polarizer provides tunable filtering of the collected radiation based on polarization. Filtered radiation is output from the polarization module 336. The filtered radiation is illustrated in polarization plot 354.

Figure 4:
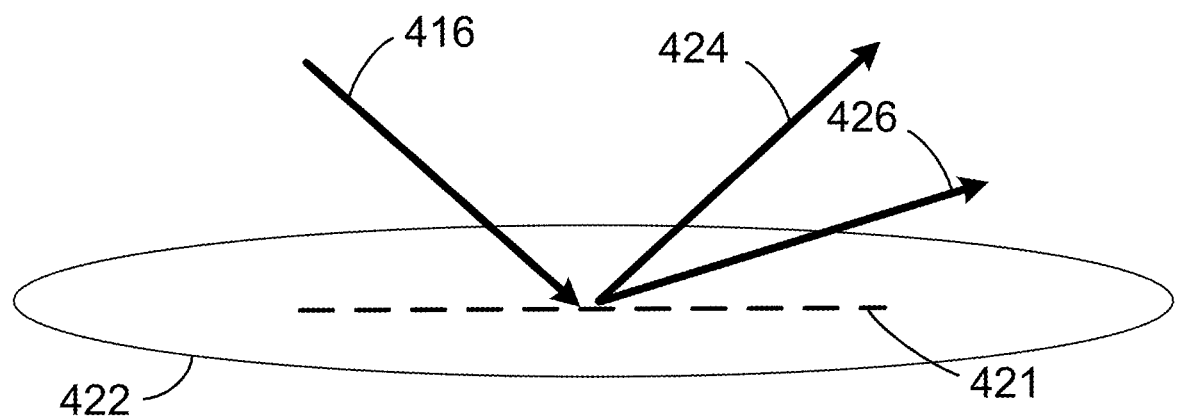
FIG. 4 is a simplified perspective view of an input beam directed onto a sample and radiation scattered by the sample in accordance with an embodiment.

FIG. 4 is a simplified perspective view of an input beam directed onto a sample and radiation scattered by the sample in accordance with an embodiment. This figure shows in input beam 416 impinging on a sample 422. Scattered radiation is separated by a line of symmetry 421 into a first portion 424 and a second portion 426. The first portion 424 has a first polarization state that is a mirror image of a second polarization state of the second portion 426.

Figure 5A:
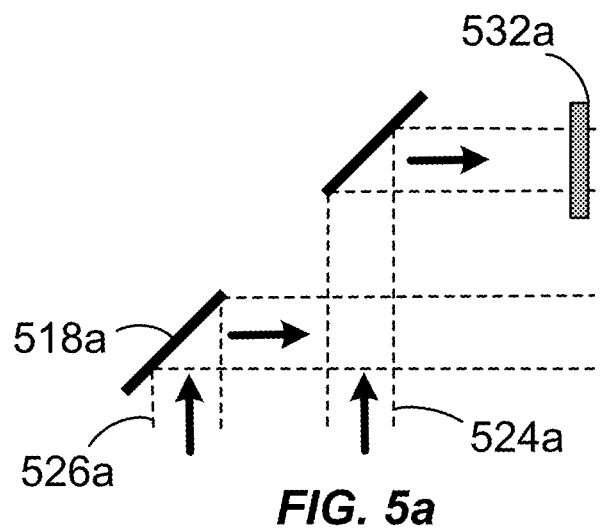
FIGS. 5a-5c are simplified cross-sectional views of a polarization mirroring device in accordance with an embodiment.
Figure 5B:
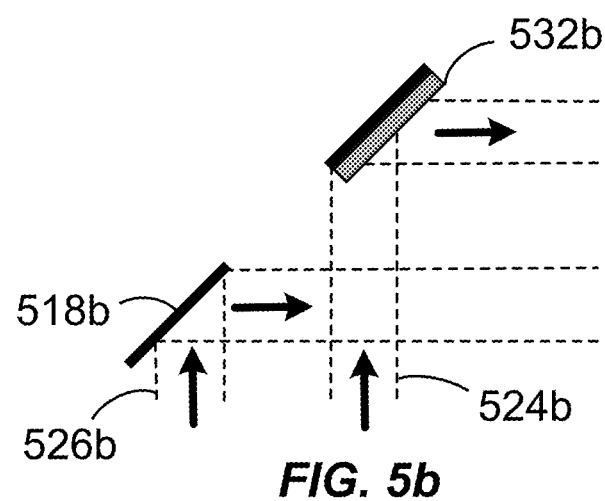
Figure 5C:
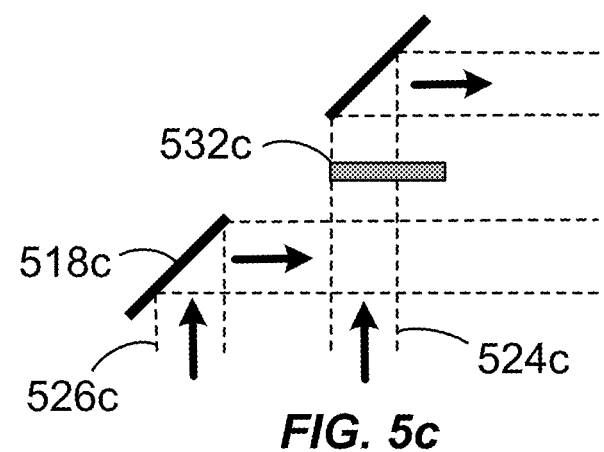

FIGS. 5a-5c are simplified cross-sectional views of a polarization mirroring device in accordance with an embodiment. The polarization mirroring device may be arranged in a number of different configurations relative to an aperture plate. In the example shown in FIG. 5a, the polarization mirroring device 532a is spaced from the aperture plate 518a and is located downstream of the aperture plate 518a along an optical path. The polarization mirroring device 532a may include a half wave plate with a main axis that is parallel to the mirroring symmetry. The first portion 524a of the scattered radiation is directed from the aperture plate 518a to the polarization mirroring device 532a.

In the example shown in FIG. 5b, the polarization mirroring device 532b is arranged adjacent to the aperture plate 518b. The first portion 524b of the scattered radiation passes through the polarization mirroring device 532b as it propagates to and from the aperture plate 518b. The polarization mirroring device 532b may include a quarter wave plate with a main axis that is parallel to the mirroring symmetry.

In the example shown in FIG. 5c, the polarization mirroring device 532c is spaced from the aperture plate 518c and is located upstream of the aperture plate 518c along an optical path. The polarization mirroring device 532c may include a half wave plate with a main axis that is parallel to the mirroring symmetry. The first portion 524c of the scattered radiation is directed from the polarization mirroring device 532c to the aperture plate 518c. In each of the examples shown in FIGS. 5a-5c, the polarization mirroring device 532 is configured to transpose the polarization state of the first portion 524 of the scattered radiation to substantially the second polarization state.

Figure 6:
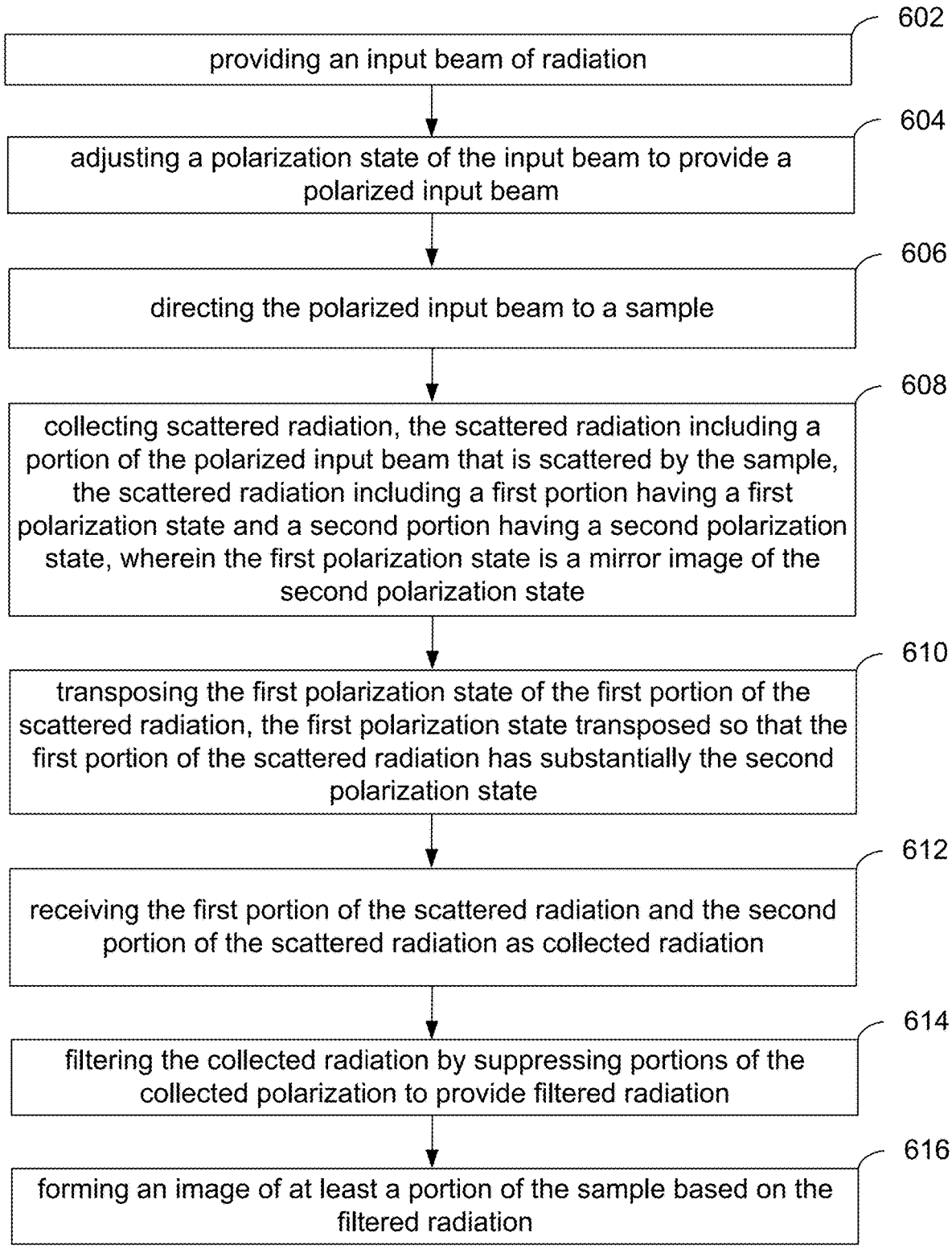
FIG. 6 is a flowchart that outlines a method for performing an optical inspection of a sample in accordance with an embodiment.

FIG. 6 is a flowchart that outlines a method for performing an optical inspection of a sample in accordance with an embodiment. The method includes providing an input beam of radiation (602), and adjusting a polarization state of the input beam to provide a polarized input beam (604).

The method also includes directing the polarized input beam to the sample (606). The sample may be patterned in some embodiments and unpatterned in others. The polarized input beam may illuminate all or a portion of the sample, or the polarized input beam may be focused into a spot on the sample. In some embodiments, the polarized input beam is directed to the sample at an oblique angle, while in other embodiments the polarized input beam is directed onto the sample as normal illumination.

The method also includes collecting scattered radiation, the scattered radiation including a portion of the polarized input beam that is scattered by the sample, the scattered radiation including a first portion having a first polarization state and a second portion having a second polarization state, wherein the first polarization state is a mirror image of the second polarization state (608). The first portion of the scattered radiation may be a first angular portion, the second portion of the scattered radiation may be a second angular portion, and at a pupil plane, the first angular portion may be a mirror image of the second angular portion.

The method also includes transposing the first polarization state of the first portion of the scattered radiation, the first polarization state transposed so that the first portion of the scattered radiation has substantially the second polarization state (610). The first polarization state may be transposed using a polarization mirroring device.

The method also includes receiving the first portion of the scattered radiation and the second portion of the scattered radiation as collected radiation (612), and filtering the collected radiation by suppressing portions of the collected radiation to provide filtered radiation (614). The collected radiation may be collected and filtered using a polarization module that includes a tunable polarization device for altering a polarization state of the collected radiation to provide the filtered radiation.

The method also includes forming an image of at least a portion of the sample based on the filtered radiation (616). In some embodiments, the method also includes identifying defects on the sample based on the image.

It should be appreciated that the specific steps illustrated in FIG. 6 provide a particular method according to an embodiment. Other sequences of steps may also be performed according to alternative embodiments. For example, alternative embodiments may perform the steps outlined above in a different order. Moreover, the individual steps illustrated in FIG. 6 may include multiple sub-steps that may be performed in various sequences. Furthermore, additional steps may be added or removed depending on the particular application.

While the foregoing is directed to specific embodiments, other and further embodiments may be devised without departing from the basic scope thereof, and the scope thereof is determined by the claims that follow.

What is claimed is:

1. A system for optical inspection of a patterned sample, comprising:
   a radiation source configured to provide an input beam;
   a first polarization module configured to adjust a polarization state of the input beam;
   a lens module arranged to:
      receive the input beam from the first polarization module and focus the input beam onto the patterned sample at an oblique angle; and
      collect scattered radiation, the scattered radiation including a portion of the input beam that is scattered by the patterned sample, the scattered radiation including a first portion having a first polarization state and a second portion having a second polarization state, wherein the first polarization state is a mirror image of the second polarization state;
   an aperture plate arranged at a pupil plane, the aperture plate having at least one aperture for allowing the input beam to pass through the aperture plate, the aperture plate arranged to receive the first and second portions of the scattered radiation from the lens module;
   a polarization mirroring device arranged to receive the first portion of the scattered radiation from the aperture plate, the polarization mirroring device configured to transpose the first polarization state so that the first portion of the scattered radiation output from the polarization mirroring device has substantially the second polarization state;
   a second polarization module arranged to receive the first portion of the scattered radiation output from the polarization mirroring device and the second portion of the scattered radiation from the aperture plate, the first portion of the scattered radiation output from the polarization mirroring device and the second portion of the scattered radiation from the aperture plate forming collected radiation, the second polarization module configured to filter the collected radiation based on polarization to provide filtered radiation; and
   a detector module configured to receive the filtered radiation from the second polarization module and direct the filtered radiation to a detector to form an image of at least a portion of the patterned sample.

2. The system of claim 1 wherein the detector module is further configured to identify defects on the patterned sample based on the image.

3. The system of claim 1 wherein the second polarization module is configured to filter the collected radiation to suppress portions of the collected radiation based on a pattern on a surface of the patterned sample.

4. The system of claim 1 wherein the aperture plate includes a mirror configured to reflect the first and second portions of the scattered radiation.

5. The system of claim 1 wherein the first portion of the scattered radiation is a first angular portion, the second portion of the scattered radiation is a second angular portion, and at the pupil plane the first angular portion is a mirror image of the second angular portion.

6. The system of claim 1 wherein the second polarization module is a tunable polarization device configured to filter the first and second portions of the scattered radiation.

7. The system of claim 1 wherein the second polarization module includes at least one waveplate to transpose a polarization state of the collected radiation and a polarizer to filter the collected radiation and provide the filtered radiation.

8. The system of claim 1 wherein the polarization mirroring device is arranged adjacent to the aperture plate.

9. The system of claim 1 wherein the polarization mirroring device is spaced from the aperture plate and is located downstream of the aperture plate along an optical path.

10. The system of claim 1 wherein the polarization mirroring device is spaced from the aperture plate and is located upstream of the aperture plate along an optical path.

11. A system for optical inspection of a sample, comprising:
a radiation source configured to provide an input beam;
a first polarization module configured to adjust a polarization state the input beam;
a lens module arranged to:
receive the input beam from the first polarization module and direct the input beam onto the sample; and
collect scattered radiation, the scattered radiation including a portion of the input beam that is scattered by the sample, the scattered radiation including a first portion having a first polarization state and a second portion having a second polarization state, wherein the first polarization state is a mirror image of the second polarization state;
an aperture plate arranged at a pupil plane, the aperture plate having at least one aperture, the aperture plate arranged to receive the first and second portions of the scattered radiation from the lens module;
a polarization mirroring device arranged to receive the first portion of the scattered radiation, the polarization mirroring device configured to transpose the first polarization state so that the first portion of the scattered radiation output from the polarization mirroring device has substantially the second polarization state;
a second polarization module arranged to receive the first portion of the scattered radiation output from the polarization mirroring device and the second portion of the scattered radiation from the aperture plate, the first portion of the scattered radiation output from the polarization mirroring device and the second portion of the scattered radiation forming collected radiation, the second polarization module configured to filter the collected radiation by suppressing portions of the scattered radiation to provide filtered radiation; and
a detector module configured to receive the filtered radiation from the second polarization module and direct the filtered radiation to a detector to form an image of at least a portion of the sample.

12. The system of claim 11 wherein the input beam is directed onto the sample at an oblique angle.

13. The system of claim 11 wherein the input beam is directed onto the sample as normal illumination.

14. The system of claim 11 wherein the lens module includes a first lens arranged to direct the input beam onto the sample and a second lens arranged to collect the scattered radiation.

15. The system of claim 11 wherein the first and second portions of the scattered radiation pass through the aperture in the aperture plate.

16. A method for performing an optical inspection of a sample, the method comprising:
providing an input beam of radiation;
adjusting a polarization state of the input beam to provide a polarized input beam;
directing the polarized input beam to the sample;
collecting scattered radiation, the scattered radiation including a portion of the polarized input beam that is scattered by the sample, the scattered radiation including a first portion having a first polarization state and a second portion having a second polarization state, wherein the first polarization state is a mirror image of the second polarization state;
transposing the first polarization state of the first portion of the scattered radiation using a polarizing mirroring device, the first polarization state transposed so that the first portion of the scattered radiation output from the polarizing mirroring device has substantially the second polarization state;
receiving the first portion of the scattered radiation output from the polarizing mirroring device and the second portion of the scattered radiation at a polarization module as collected radiation;
filtering the collected radiation by suppressing portions of the collected radiation based on polarization to provide filtered radiation; and
forming an image of at least a portion of the sample based on the filtered radiation.

17. The method of claim 16 further comprising identifying defects on the sample based on the image.

18. The method of claim 16 wherein the first portion of the scattered radiation is a first angular portion, the second portion of the scattered radiation is a second angular portion, and at a pupil plane, the first angular portion is a mirror image of the second angular portion.

19. The method of claim 16 further comprising altering a polarization state of the filtered radiation prior to forming the image.

20. The method of claim 19 wherein the polarization state of the collected radiation is altered using a tunable polarization device to provide the filtered radiation.

* * * * *